(12) United States Patent
Bradfield

(10) Patent No.: US 8,629,597 B2
(45) Date of Patent: Jan. 14, 2014

(54) AIRFLOW PASSAGE ARRANGEMENT FOR CLAW-POLE ELECTRIC MACHINES

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 337 days.

(21) Appl. No.: 12/716,549

(22) Filed: Mar. 3, 2010

(65) Prior Publication Data

US 2011/0215681 A1 Sep. 8, 2011

(51) Int. Cl.
*H02K 1/22* (2006.01)
*H02K 1/24* (2006.01)
*H02K 15/02* (2006.01)

(52) U.S. Cl.
CPC *H02K 1/243* (2013.01); *H02K 1/24* (2013.01); *H02K 1/22* (2013.01); *H02K 15/022* (2013.01)
USPC ............. 310/263; 310/216.093; 310/60 R

(58) Field of Classification Search
CPC .... H02K 21/044; H02K 1/243; H02K 15/022
USPC ................... 310/60 R, 216.093, 263
IPC ............................. H02K 1/22, 1/24
See application file for complete search history.

(56) References Cited

U.S. PATENT DOCUMENTS

| | | | | |
|---|---|---|---|---|
| 2,928,963 A | * | 3/1960 | Bertsche et al. | 310/168 |
| 3,271,606 A | * | 9/1966 | Collins | 310/263 |
| 4,087,713 A | * | 5/1978 | Binder | 310/266 |
| 4,221,982 A | * | 9/1980 | Raver et al. | 310/59 |
| 4,307,309 A | | 12/1981 | Barrett | |
| 4,358,695 A | * | 11/1982 | MacDonald et al. | 310/105 |
| 4,423,344 A | * | 12/1983 | Jones | 310/105 |
| 4,611,139 A | * | 9/1986 | Godkin et al. | 310/266 |
| 4,821,561 A | | 4/1989 | Takahashi et al. | |
| 4,972,114 A | * | 11/1990 | Frister | 310/263 |
| 5,270,605 A | * | 12/1993 | Lefrancois et al. | 310/263 |
| 5,437,090 A | * | 8/1995 | Sakane et al. | 29/598 |
| 5,708,318 A | * | 1/1998 | Fudono | 310/263 |
| 6,114,793 A | * | 9/2000 | Asao et al. | 310/263 |
| 6,384,506 B1 | * | 5/2002 | Kojima et al. | 310/194 |
| 6,476,535 B1 | * | 11/2002 | Oohashi et al. | 310/263 |
| 6,989,622 B1 | | 1/2006 | Chen et al. | |
| 7,345,391 B2 | | 3/2008 | Bradfield et al. | |
| 7,525,233 B2 | | 4/2009 | Itoh et al. | |
| 7,592,735 B2 | | 9/2009 | Hamada | |
| 7,687,954 B2 | * | 3/2010 | Neet et al. | 310/91 |
| 7,800,275 B2 | * | 9/2010 | Calley | 310/257 |
| 2002/0014807 A1 | * | 2/2002 | Murata et al. | 310/263 |
| 2002/0021052 A1 | * | 2/2002 | Asao | 310/263 |
| 2002/0096965 A1 | * | 7/2002 | Ikeda et al. | 310/263 |
| 2003/0137214 A1 | * | 7/2003 | Ishizuka et al. | 310/263 |

(Continued)

*Primary Examiner* — John K Kim
(74) *Attorney, Agent, or Firm* — Maginot, Moore & Beck

(57) ABSTRACT

An electric machine includes a stator and a rotor configured to rotate about an axis of rotation in a direction of angular rotation. The rotor includes a first claw-pole segment and an opposing second claw-pole segment. The first claw-pole segment includes a plurality of fingers extending from an end ring. Each finger includes a distal end and a proximal end with the proximal end fixed to the end ring. Each finger also includes an interior side and an exterior side with the exterior side facing the stator. A leading side and a trailing side are defined on each finger by the direction of angular rotation. A chamfer is formed on the exterior trailing side of each finger at the proximal end of the finger.

20 Claims, 7 Drawing Sheets

(56) References Cited

U.S. PATENT DOCUMENTS

| | | |
|---|---|---|
| 2006/0279165 A1 | 12/2006 | Fulton et al. |
| 2007/0018531 A1* | 1/2007 | Kuroda et al. ............... 310/263 |
| 2007/0188043 A1* | 8/2007 | Utsumi et al. ............... 310/263 |
| 2008/0024033 A1* | 1/2008 | Lutz et al. ............... 310/263 |
| 2008/0088199 A1* | 4/2008 | Hamada ............... 310/263 |
| 2011/0215681 A1* | 9/2011 | Bradfield ............... 310/60 R |

* cited by examiner

AIRFLOW PASSAGE ARRANGEMENT FOR CLAW-POLE ELECTRIC MACHINES

FIELD

This application relates to the field of electric machines, and particularly to cooling air flow arrangements in electric machines with claw-pole rotors.

BACKGROUND

Alternators with claw-pole rotor arrangements (also known as "Lundell" type rotors) are commonly used in light-duty and heavy-duty vehicle applications. These alternators include a claw-pole rotor, a stator, a rectifier and a voltage regulator. The rotor is comprised of a field coil wound over an iron core and two opposing claw-pole iron segments surrounding the field coil. Each claw-pole iron segment typically includes six to nine fingers that are interlaced with the same number of fingers from the opposing claw-pole iron segment. When current flows through the field winding, one of the claw-pole segments provides a magnetic north segment and the other provides a magnetic south segment. Thus, the interlaced fingers of the claw-pole configuration result in a rotor with an alternating N pole, S pole arrangement.

Rotation of the rotor provides a rotating magnetic field. This rotating magnetic field induces a voltage in the windings positioned on the stator. The magnetic field in the stator rotates at the same speed, or synchronously, with the rotor field. The stator windings are connected to the rectifier, which converts the AC stator output to a DC output. At the same time, the voltage regulator monitors the system voltage and adjusts the output of the alternator by controlling the current through the field coil.

During operation of the claw-pole alternator, the alternator must be cooled to maintain the efficiency and performance of the alternator. The alternator is typically cooled by air flowing through the alternator, and it is generally desirable to direct as much cooling air as possible through the alternator. Air flow through the alternator is generally urged by a fan at the front of the alternator that acts to lower the air pressure within the alternator and draw cooling air into the alternator. Air flows from the rear of the alternator to the front of the alternator where it is expelled by the fan. The air expelled from the alternator is combined with the under hood airflow in the vehicle. This under hood vehicle airflow is generally from the front of the vehicle to the rear due substantially to the forward movement of the vehicle and the action of radiator cooling fans disposed at the front of the vehicle. Thus, the heated air expelled from the alternator, combines with the under hood airflow, and is carried back to the rear of the alternator where at least a portion of the heated air is re-circulated through the alternator.

In view of the foregoing, it would be desirable to provide an alternator arrangement having an improved airflow arrangement capable of directing an increased volume of cooling air through the alternator. It would also be desirable if such improved airflow arrangement could be accomplished simply without adding a significant number of additional components to the alternator. It would also be desirable if such improved airflow arrangement could be achieved without disturbing the arrangement of components within the alternator or significantly affecting electrical and magnetic performance of the alternator.

SUMMARY

An electric machine comprises a stator and a rotor configured to rotate about an axis of rotation in a direction of angular rotation. The rotor includes a first claw-pole segment and an opposing second claw-pole segment. The first claw-pole segment includes a plurality of fingers extending from an end ring. Each finger includes a distal end and a proximal end with the proximal end fixed to the end ring. Each finger also includes an interior side and an exterior side with the exterior side facing the stator. A leading side and a trailing side are defined on each finger by the direction of angular rotation. An indentation is formed on the exterior trailing side of each finger at the proximal end of the finger. Because of this indentation, each finger is asymmetrical in shape along a plane of symmetry extending through an axial centerline of the finger and through the axis of rotation of the rotor.

In accordance with one embodiment of the disclosure, there is provided a method of cooling an alternator having a claw-pole rotor arrangement using a stream of air flowing through the alternator. The method comprises rotating the rotor arrangement in an angular direction of rotation. The method further comprises receiving a stream of air into a first end of the alternator such that the stream of air flows over an exterior surface of the claw pole arrangement. The stream of air then flows over a chamfer on a trailing edge of a finger of the claw-pole rotor arrangement. Next, the stream of air flows between fingers on opposing segments of the claw-pole rotor arrangement and over a field winding positioned on the interior of the claw-pole arrangement.

Pursuant to yet another embodiment of the disclosure, there is provided an alternator comprising a stator including a stator core and a plurality of stator windings. The alternator includes a rotor positioned within the stator, with the rotor configured to rotate about an axis of rotation in a direction of angular rotation. The rotor includes an open segment and a closed segment with a field winding positioned inside of the open segment and the closed segment. The open segment and the closed segment include a plurality of interlaced fingers with a web portion positioned between adjacent fingers on the open segment. Each finger on the open segment includes an interior side and an exterior side with the exterior side facing the stator and the interior side facing the field windings. A leading side and a trailing side of each finger are defined by the direction of angular rotation. A chamfer is formed on the exterior trailing side of each finger adjacent to the web portion.

The above described features and advantages, as well as others, will become more readily apparent to those of ordinary skill in the art by reference to the following detailed description and accompanying drawings. While it would be desirable to provide an alternator arrangement that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
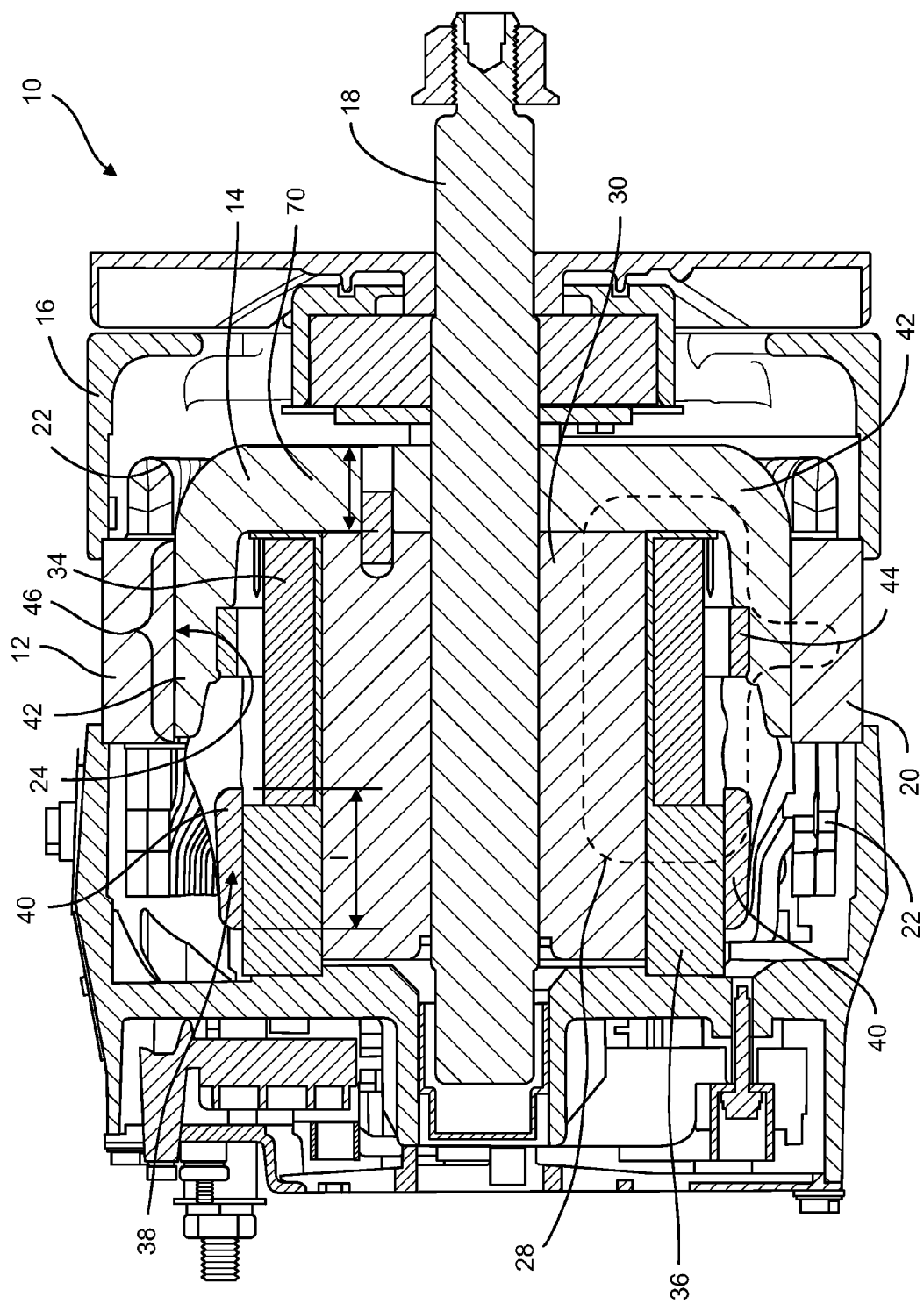
FIG. 1 shows a cross-sectional view of one embodiment of a claw pole electric machine.

With reference to FIG. 1, an electric machine is shown in the form of a claw-pole alternator 10. The alternator includes a stator 12 and a claw-pole rotor 14 positioned within a housing 16. The rotor is connected to a shaft 18. As is well known in the art, the shaft 18 is driven by a belt (not shown) during operation of the vehicle in which the alternator is mounted.

The stator 12 is stationary within the alternator housing 16. The stator 12 includes a stator core 20 and stator windings 22. The stator core 20 includes a plurality of teeth that extend radially inward from the outer diameter of the stator core. The stator windings 22 are retained by slots formed between the teeth of the stator core. The stator windings 22 may be formed by insulated copper wires that form coils that wrap around the stator core. The coils are separated into three distinct winding segments that provide a three-phase electrical output for the alternator 10.

The rotor 14 is rotatably positioned inside of the stator 12 within the alternator. The rotor 14 is separated from the stator 12 by an airgap 24 in an active airgap region 46 of the rotor. The rotor 14 includes an iron core 30, a field coil 34, and two claw-pole segments 40, 42. In the disclosed embodiment, the field coil 34 is wound around an iron spool 36, and the field coil 34 and spool 36 are stationary within the alternator housing 16. The first claw-pole segment 40 is positioned radially outward from the spool 36 and is separated from the spool 36 by an air gap 38. The first claw-pole segment 40 is connected to the second claw-pole segment 42 by a connection ring 44, and the second claw-pole segment 42 is secured to the shaft 18. The rotor core 30 is also secured to the second claw-pole segment 42 and the shaft 18. Accordingly, the iron core 30, the first claw-pole segment 40 and the second claw-pole segment 42 are all rotatable with the shaft 18 within the alternator housing 16.

Figure 2:
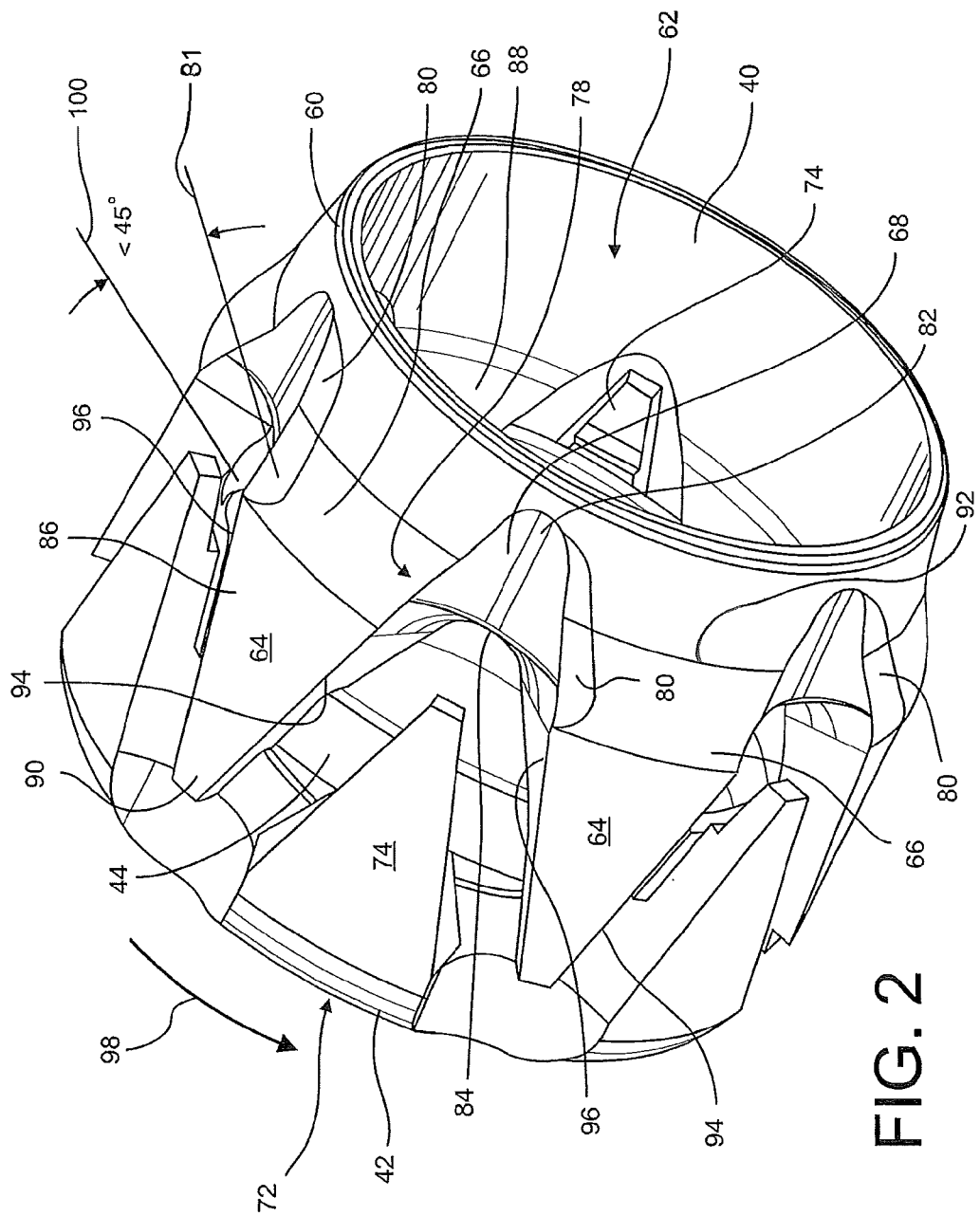
FIG. 2 shows an isolated perspective view of two claw-pole segments of the electric machine of FIG. 1.

FIG. 2 shows a perspective view of the first and second claw pole segments 40, 42 isolated from the remaining portions of the rotor 14. The first claw pole segment 40 is generally crown shaped with a circular end band or end ring 60. The cylindrical end ring 60 defines a generally open end portion 62, and thus this segment 40 is sometimes referred to as an "open segment". A plurality of fingers 64 extend from the end ring 60 with knuckle portions 66 positioned on the fingers 64. In the embodiment of FIG. 2, the knuckle portions 66 are generally enlarged portions on the finger. In FIG. 2, the knuckles 66 provide a sloped surface 78 on each finger 64.

Each finger 64 of the open segment 40 includes an exterior side 86 that faces the stator 12, an interior side 88 that faces the field winding 34, a distal end 90 that is furthest from the cylindrical end ring 60, and a proximal end 92 that is fixedly connected to the end ring 60. Each finger 64 also includes a leading side/edge 94 and a trailing side/edge 96, with the leading edge 94 and trailing edge 96 of each finger defined by a direction of angular rotation of the rotor, as noted by arrow 98.

Web portions 68 extend between adjacent fingers 64 on the first claw pole segment 40 near the knuckle portions 66. The web portions 68 provide a smooth curved surface that extends between adjacent fingers 64. In the embodiment of FIG. 2, the surface of each web portion 68 is bounded at least in part by substantially parabolic interior and exterior perimeters. The substantially parabolic exterior perimeter provides a first vertex 82 located where the proximal end 92 of the finger is connected to the end ring 60. The substantially parabolic interior perimeter provides a second vertex 84 on the distal edge of the open segment at a point centered between adjacent fingers 64. Between the vertices 82 and 84, the smooth web surface 68 gradually transitions from the exterior surface to the interior surface.

Figure 4:
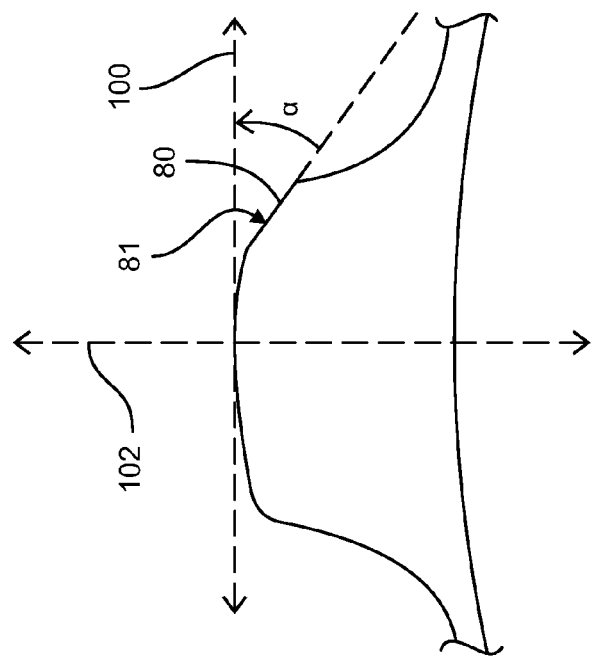
FIG. 4 shows a cross-sectional view of the finger of the claw-pole segment along line V-V of FIG. 3.
Figure 3:
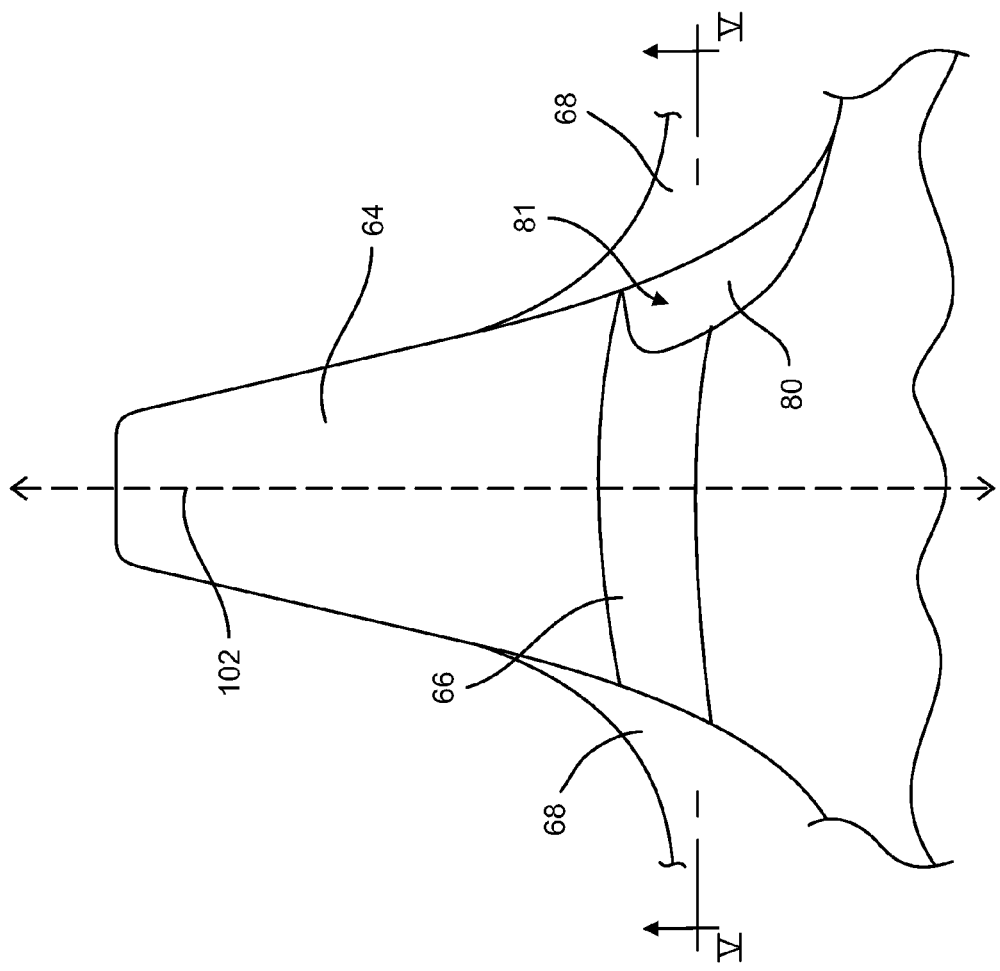
FIG. 3 shows a top view of a finger of one of the claw-pole segments of FIG. 2.

With particular reference to FIGS. 2-4, the fingers 64 include indentations 80 along the edges of the fingers adjacent to the web portions 68. The indentations in the embodiment of FIGS. 2-4 are provided as beveled edges that form chamfers 80 on the trailing edges of the fingers 64. More specifically, each chamfer 80 is formed on the exterior side 86 of a finger 64 at the proximal end 92 of the finger, with the chamfer 80 positioned on the trailing side 96 of such finger 64. The chamfers 80 are positioned on the rotor such that each chamfer is substantially outside of the airgap region of the rotor. Accordingly, most of the chamfer 80 does not face the active airgap 24 between the stator and the rotor.

In the embodiment of FIGS. 2-4, each chamfer 80 provides a chamfered surface 81 that extends the substantial length of the web portion 68 adjacent to the chamfer 80 on the exterior trailing side of the associated finger 64. The chamfers 80 are elongated in shape with a largest chamfer dimension extending in a substantially axial direction (i.e., more in the direction of the shaft 18 than in the direction of angular 98). In the embodiment of FIGS. 2-4, the larger chamfer dimension is about 20 mm and the smaller dimension is about 8 mm. In at least one embodiment, the elongated chamfer 80 has a larger chamfer dimension of about 10-60 mm and a smaller chamfer dimension of about 4-20 mm.

As illustrated FIGS. 2 and 4, the chamfered surface 81 forms an angle α with a tangency line 100 defined at a point on the axial centerline of the finger 64. This angle α is typically less than forty-five degrees. In at least one embodiment, the chamfered surface 81 is less than thirty degrees relative to the tangency line 100 on the exterior side of the finger 64 (i.e., α<30°). In at least one embodiment, the chamfered surface 81 is a generally flat surface. However, it will be recognized that in other embodiments, the chamfered surface could include a surface with a compound angle or a generally a curved surface. It will also be recognized that the chamfered surface 81 may be formed in any number of ways. For example, in one embodiment, the trailing edges of the fingers initially include a compound angle. The segment is then rotated about two angles to establish the chamfer line. Once in position, the trailing edge of each finger is machined with an end mill as a straight cut. Other examples of methods for forming the chamfered surface include cold forming or hot forging the chamfered surface directly into the segment when it is formed.

The chamfered surface 81 results in a finger 64 that is asymmetrical in shape relative to an axial plane of symmetry. The plane of symmetry is represented in FIGS. 3 and 4 by dashed lines 102. As illustrated in FIGS. 3 and 4, the plane of symmetry 102 extends through an axial centerline of the finger 64 and through the axis of rotation of the rotor. When viewing the opposing sides of the finger 64 relative to this plane of symmetry 102, it is clear that the finger 64 is asymmetrical because of the chamfer 80. However, it will be recognized that except for the chamfer 80, the finger 64 would be symmetrical about the plane of symmetry 102. As explained in further detail below, the strategic location of these chamfers 80 on the trailing edges of the fingers 64 provides for an electric machine with an improved airflow arrangement.

With reference again to FIG. 2, the second claw-pole segment 42 is also crown shaped with a plurality of fingers 74 extending from a generally closed end portion or wall 72. Because of this end wall 72, the second segment 42 is sometimes referred to as a "closed segment". The end wall 72 includes a small center bore that receives the shaft 18 of the alternator and allows the second segment 42 to be fixed to the shaft 18.

The fingers 74 of the second segment 42 are interlaced with fingers 64 from the opposing first segment 40. In particular, the fingers 74 of the second segment 42 extend toward the first segment 40 and into gaps between the fingers 64 of the first segment 40. Likewise, the fingers 64 of the first segment 40 extend toward the second segment 42 and into gaps between the fingers 74 of the second segment 42. As a result, the fingers 64, 74 alternate around the center of the segments 40, 42. A center ring 44 connects the first segment 40 to the second segment at the center of the segments 40, 42. As explained in further detail below, because the fingers 64 and 74 define poles for the rotor 14, fingers 64 and 74 may also be referred to herein as rotor "poles".

General operation of the alternator 10 is now described with reference again to FIG. 1. When current flows through the field coil 34, it produces a magnetic field with an N pole at one end of the field coil and an S pole at the opposite end of the field coil. The two claw pole segments 40, 42 of the rotor 14 channel the magnetic flux produced from the field coil 34 to the appropriate surface on the stator 12. The useful flux linkage between the stator 12 and the rotor 14 is shown in FIG. 1 by dotted lines 28. The useful flux path 28 is in the form of a closed loop that travels through the stator 12, the claw-pole segments 40, 42, the spool 36, the rotor core 32, and any air gaps between such components along dotted line 28, such as air gap 38.

Because the current in the field winding 34 is DC, one claw-pole segment is always magnetic N, and the other claw-pole segment is magnetic S. Further, because the fingers of the claw pole segments are interlaced, this result in an alternating N pole, S pole arrangement. Since the claw-pole segments 40, 42 are attached to the rotating alternator shaft 18, the magnetic field experienced by the stator 12 at any fixed point alternates between N and S in a cyclical or AC fashion. This rotating magnetic field induces a voltage in the stator windings. The stator windings are connected to a diode rectifier that converts the AC stator output to a DC output that is used to charge the battery and power vehicle loads. A voltage regulator monitors the system voltage and adjusts the output of the alternator by controlling the current through the field coil.

In the embodiment of FIG. 1, it should be noted that the open claw-pole segment 40 interfaces with the stationary portion of the core (i.e., the iron spool 36) at air gap 38. It is generally desirable to minimize this air gap 38 to increase performance of the alternator 10. Consequently, the axial length of the open segment 40 is typically elongated in this region (as noted by dimension l) to increase the surface area at the gap 38 and increase the permeance (i.e., to reduce magnetic reluctance) of the rotor 14 in this region. Because of this, the amount of iron or other magnetic material in this region can often be more than is necessary for proper magnetic performance. Accordingly, the chamfers 80 on the open segment 40 result in reduced magnetic material on the open segment, but have minimal impact on the magnetic performance of the alternator. Indeed, as explained in further detail below, the chamfers 80 actually improve output through increased airflow through the rotor, and higher rotor excitation.

Figure 5:
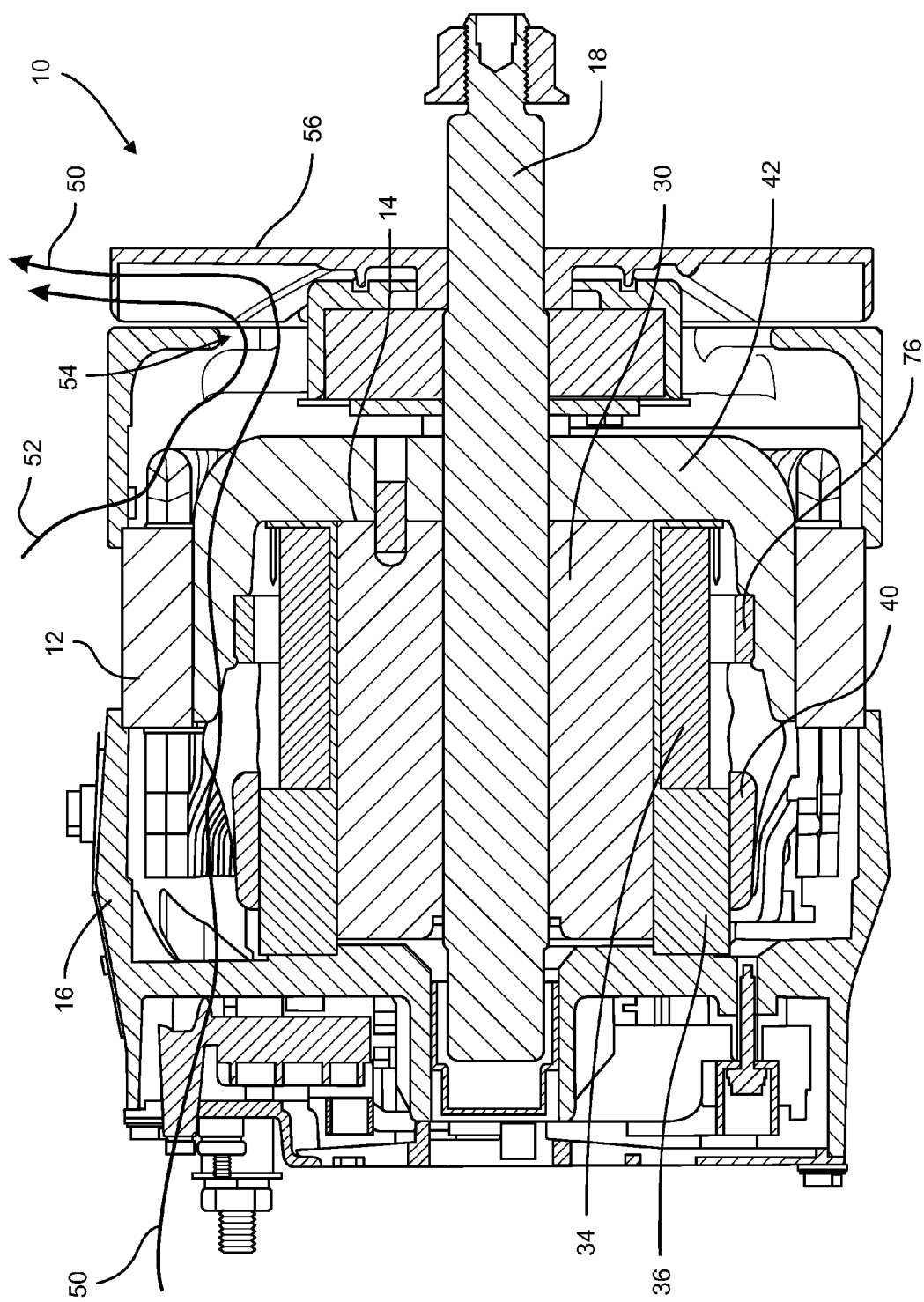
FIG. 5 shows a cross-sectional view of the claw pole electric machine of FIG. 1 illustrating an air stream through the electric machine.

With reference now to FIG. 5, lines 50 and 52 show exemplary cooling air streams flowing through the alternator 10 in a generally axial direction. The air streams 50, 52 enter the alternator housing 16 through various openings in the housing. A fan 56 mounted on the shaft 18 creates low pressure within the alternator housing, thus drawing cooling air into the openings in the housing 16. The fan 56 draws the air through the alternator, and then blows air exiting alternator 10 away from the housing 12. Air stream 50 enters through the rear end (also referred to as the "open end") of the alternator 10. Air stream 50 flows through the rotor 14 and over the field coil 34 before exiting out of exit port 54 at the rear of the housing 16. Air stream 52 enters through a side opening in the housing 16 and flows over the stator windings 22 before exiting through the exit port 54.

The generally axial flow of air through the alternator 10 is disrupted during operation of the alternator by rotation of the rotor 14 at the center of the alternator 10. In particular, the cooling air typically enters the claw-pole alternator at or near the rear of the alternator and travels toward the front in a generally axial direction. However, in the center of the alternator is the rotor 14 that is rotating during alternator operation. Because of this rotation, air enters into openings between the fingers 64, 74 of the claw-pole iron segments at an angle. In particular, before air can pass into the rotor 14, it must first flow circumferentially past a rotating finger 64 of the open claw-pole segment 40. The air must then turn after encountering an opening between the fingers, and flow in a more axial direction over the field coil at the center of the claw-pole segments. This process generally limits the flow of air through the rotor, as the change in flow momentum results in a pressure drop and generally less volume of air through the alternator.

Figure 6:
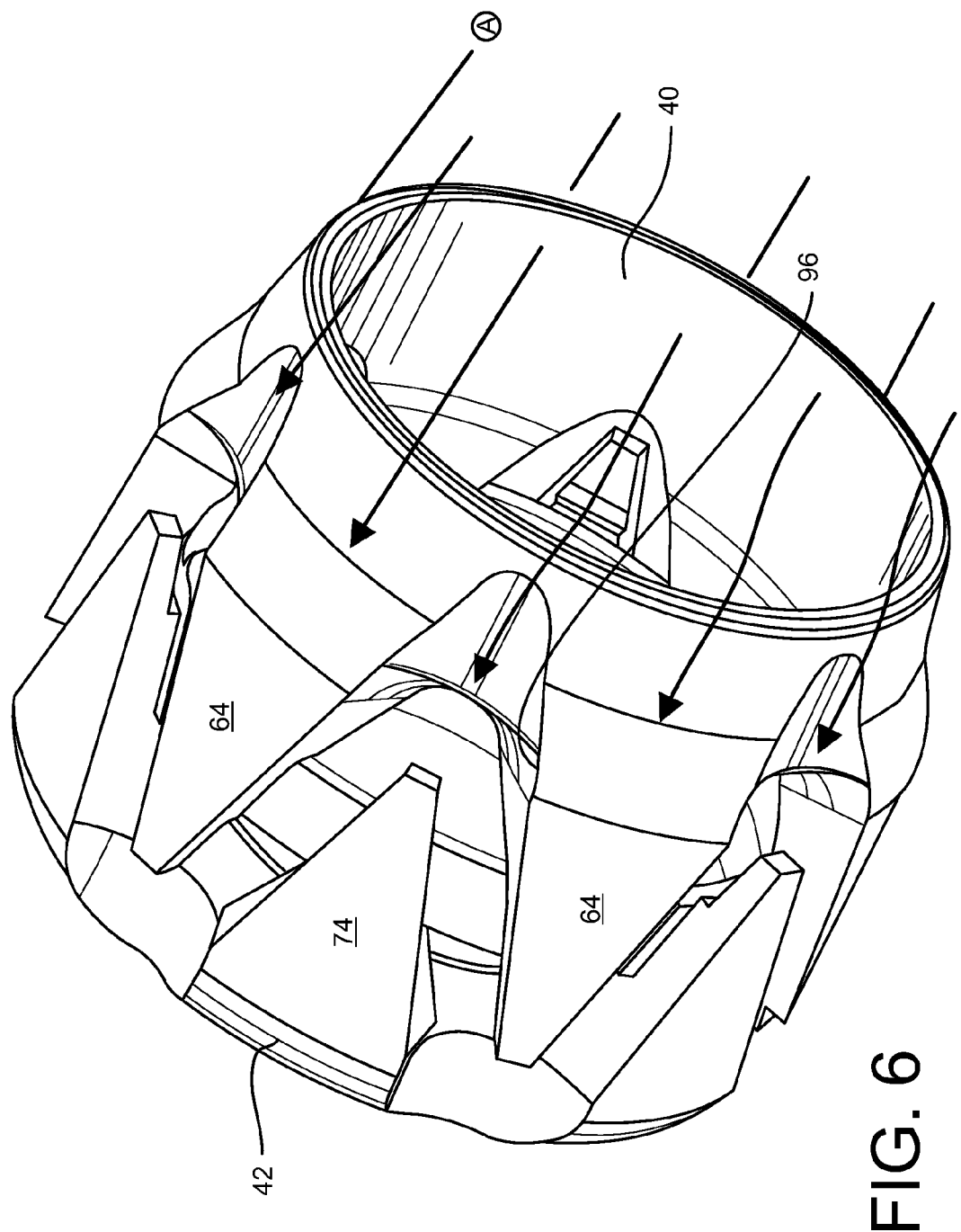
FIG. 6 shows an isolated perspective view of two claw-pole segments of an electric machine illustrating an initial direction of air flow into the electric machine.
Figure 7:
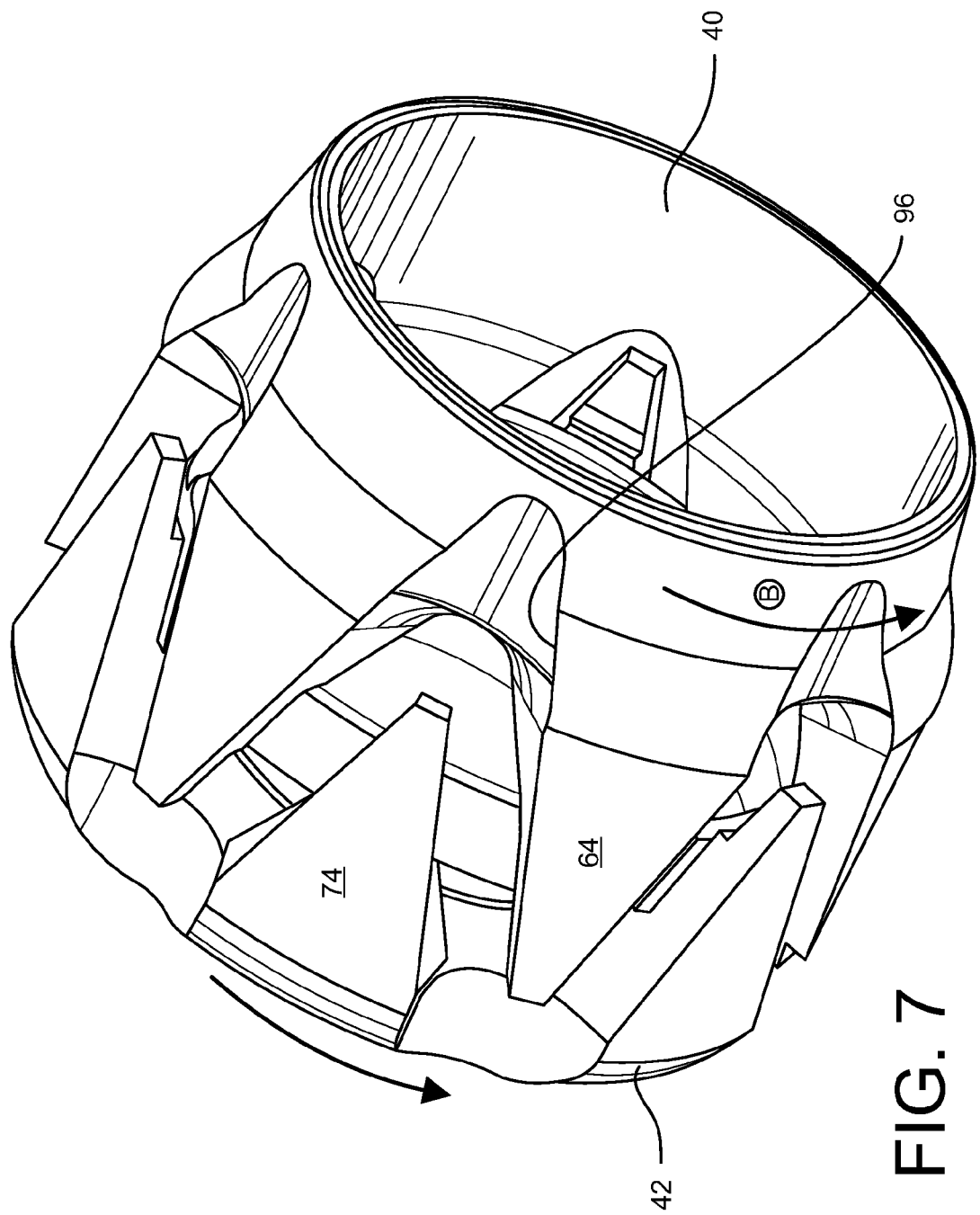
FIG. 7 shows the isolated perspective view of the two claw-pole segments of FIG. 6 illustrating the direction of angular rotation of the claw-pole segments during operation of the electric machine.
Figure 8:
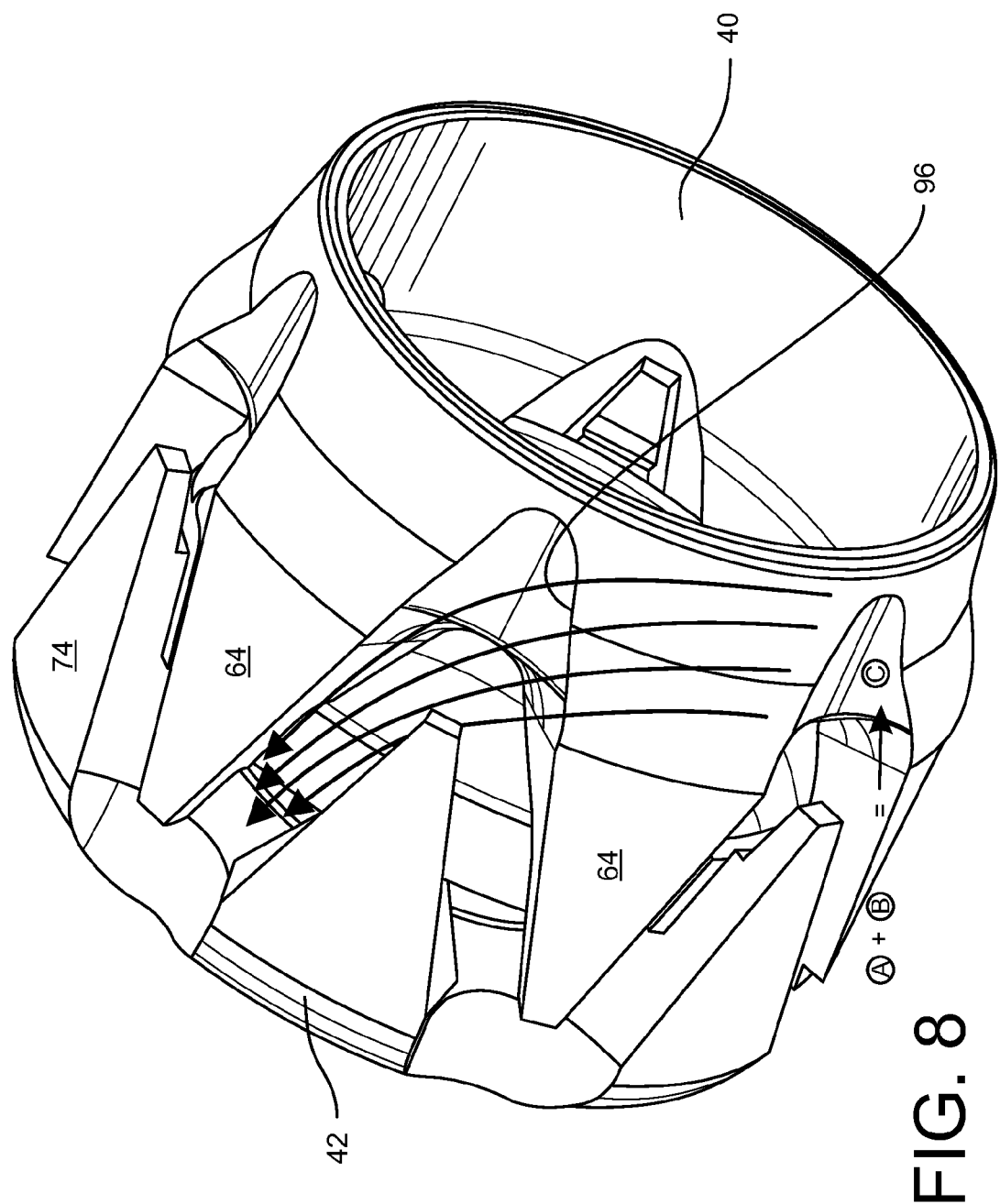
FIG. 8 shows the isolated perspective view of the two claw-pole segments of FIG. 6 illustrating the direction of air flow relative to the claw-pole segments during operation of the electric machine.

The foregoing air flow arrangement is generally illustrated in FIGS. 6-8, which show typical open and closed segments 40, 42 for a conventional claw-pole rotor 14. FIG. 6 shows an air stream "A" flowing into the rear of the alternator 10 in a generally axial direction due to the low pressure created by the fan at the front of the alternator 10. FIG. 7 shows rotation of the rotor 14 in a direction of angular rotation "B" during operation of the alternator 10. This direction "B" cuts across the axial direction "A". Accordingly, FIG. 8 shows that the combination of "A" and "B" results in air stream "C" which is the direction of air flow experienced by the rotor. Air stream "C" moves in a circumferential direction near the proximal ends of the fingers 64 and the end ring 60 of the open segment 40. However, as a given rotor finger 64 passes a fixed location at the rear of the alternator, the air stream "C" will try to flow forward toward the front of the alternator due to the low pressure created by the fan 56 at the front of the alternator. Accordingly, the air stream "C" must make a turn at the trailing edge 96 of the finger 64, as the air stream moves from a generally circumferential flow to a generally axial flow. This turn in the air stream results in a high pressure drop at the trailing edges 96 of the fingers 64, and a general loss in momentum of airflow. The high pressure drop and loss of momentum results in a reduced volume of air flowing around the fingers and through the rotor 14. With a reduced volume of air flowing through the rotor 14, the alternator remains at a relatively higher temperature and generally experiences decreased performance ratings.

In the embodiment of FIGS. 1-4, the high pressure drop encountered at the trailing edges 96 of the fingers 64 is remedied at least in part by the chamfers 80 at the trailing edges of the fingers 64. In particular, the chamfers allow cooling air to more easily turn around the trailing edges of the fingers, resulting in little pressure drop. Because the strategic position of the chamfers 80 remedies the pressure drop issue, an increased volume of air is drawn through the alternator. This results in cooler alternator operation and increased alternator performance.

It will be recognized that the above-description of the claw-pole rotor arrangement also provides for an associated method of cooling an alternator 10. Unlike the claw-pole rotor shown in FIGS. 6-8, the disclosed method involves the use of a claw-pole rotor arrangement similar to that of FIGS. 1-4. In particular, the disclosed method involves rotation of a claw-pole segment 40, such as that shown in FIG. 2, with chamfers 80 or other indentations formed on the trailing edges of the fingers 64. According to this method, the air stream drawn in to the alternator with the fan is directed to flow over an exterior surface of a claw-pole rotor segment 40, such as the end ring 60 at the rear of the segment 40. The cooling air is then directed over the chamfers 80 on the trailing edges 96 of the fingers of the open segment 40 of the claw-pole rotor arrangement. Thereafter, the stream of air flows between the fingers 64 and 74 and over the field winding 34 positioned on the interior of the claw-pole arrangement. The air stream then exits the alternator at an opposite end of the alternator. Advantageously, this method provides for an increase volume of air through the alternator, resulting in cooler alternator operation and increased alternator performance.

The foregoing detailed description of one or more embodiments of the airflow passage arrangement for claw-pole electric machines has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An electric machine comprising:
    a stator including a stator core; and
    a rotor configured to rotate about an axis of rotation in a direction of angular rotation with an active airgap defined between the rotor and the stator core, the rotor including a first claw-pole segment and an opposing second claw-pole segment, the first claw-pole segment including a plurality of fingers extending from an end ring, each finger including:
        a distal end and a proximal end with the proximal end fixed to the end ring;
        an interior side and an exterior side, the exterior side facing the stator;
        a leading side and a trailing side defined by the direction of angular rotation; and
        an indentation formed on the exterior trailing side of the finger at the proximal end of the finger, wherein the indentation does not extend to the distal end of the finger or the leading side of the finger, and wherein each finger is asymmetrical in shape relative to a plane of symmetry extending through an axial centerline of the finger and through the axis of rotation of the rotor, wherein the asymmetrical shape of the finger results from the indentation such that the finger is substantially symmetrical except for the indentation, and wherein most of the indentation does not face the active airgap.

2. The electric machine of claim 1 wherein a knuckle portion is positioned at the proximal end of the finger with the indentation on the finger extending from the end ring to the knuckle portion.

3. The electric machine of claim 1 wherein the first claw pole segment further includes a web portion extending between adjacent fingers at the proximal ends of the fingers.

4. The electric machine of claim 3 wherein the indentation on the trailing edge of each finger is provided as a surface adjacent to the web portion.

5. The electric machine of claim 4 wherein the surface adjacent to the web portion that provides the indentation is a chamfered surface that extends the substantial length of the web portion on the exterior trailing side of the finger.

6. The electric machine of claim 1 wherein the indentation is elongated in shape with a largest indentation dimension extending in a substantially axial direction.

7. The electric machine of claim 1 wherein the indentation is provided as a chamfered surface that is less than forty-five degrees relative to a tangency line on the trailing edge of the finger, wherein the tangency line is extends through a point on an axial centerline of the finger.

8. The electric machine of claim 7 wherein the chamfered surface is less than thirty degrees relative to the tangency line on the trailing edge of the finger.

9. The electric machine of claim 1 wherein the first claw pole segment and the second claw pole segment are connected by an interior ring.

10. The electric machine of claim 9 wherein the rotor includes a rotor core connected to a shaft, and wherein the second claw pole segment is connected to the shaft and the rotor core.

11. The electric machine of claim 10 further comprising a field winding positioned on a spool located inside of the first claw pole segment and the second claw pole segment.

12. The electric machine of claim 11 further comprising an air gap positioned between the spool and the first claw pole segment.

13. The electric machine of claim 1 wherein the first claw-pole segment is an open claw-pole segment and the second claw-pole segment is a closed claw-pole segment.

14. An electric machine comprising:
    a stator including a stator core; and
    a rotor configured to rotate about an axis of rotation in a direction of angular rotation with an active airgap defined between the rotor and the stator core, the rotor including a first claw-pole segment and an opposing second claw-pole segment, the first claw-pole segment including a plurality of fingers extending from an end ring, each finger including:
        a distal end and a proximal end with the proximal end fixed to the end ring;

an interior side and an exterior side, the exterior side facing the stator;

a leading side and a trailing side defined by the direction of angular rotation; and an indentation formed on the exterior trailing side of the finger at the proximal end of the finger, wherein the indentation does not extend to the distal end of the finger, wherein each finger is asymmetrical in shape relative to a plane of symmetry extending through an axial centerline of the finger and through the axis of rotation of the rotor, wherein the asymmetrical shape of the finger results from the indentation such that the finger is substantially symmetrical except for the indentation, and wherein the indentation is substantially outside of the active airgap region of the rotor.

15. The electric machine of claim 14 wherein the indentation is provided as a chamfered surface on the exterior trailing side of the finger.

16. The electric machine of claim 14 wherein a knuckle portion is positioned at the proximal end of the finger with the indentation on the finger extending from the end ring to the knuckle portion.

17. The electric machine of claim 14 wherein the first claw pole segment further includes a web portion extending between adjacent fingers at the proximal ends of the fingers.

18. The electric machine of claim 17 wherein the indentation on the trailing edge of each finger is provided as a surface adjacent to the web portion.

19. The electric machine of claim 18 wherein the surface adjacent to the web portion that provides the indentation is a chamfered surface that extends the substantial length of the web portion on the exterior trailing side of the finger.

20. An electric machine comprising:

a stator including a stator core; and a rotor configured to rotate about an axis of rotation in a direction of angular rotation, the rotor separated from the stator by an airgap in an active airgap region of the rotor, the airgap positioned between the rotor and the stator core, the rotor including a claw-pole segment with a plurality of fingers extending from an end ring, each finger including:

a distal end and a proximal end with the proximal end fixed to the end ring;

an interior side and an exterior side, the exterior side facing the stator;

a leading side and a trailing side defined by the direction of angular rotation; and a chamfer formed on the exterior trailing side of the finger at the proximal end of the finger and substantially outside of the active airgap region of the rotor, the exterior leading side of the finger void of an additional chamfer on the exterior trailing side of the finger such that the finger is asymmetrical in shape relative to a plane of symmetry extending through an axial centerline of finger and through the axis of rotation of the rotor, and the chamfer formed on the exterior trailing side of the finger not extending to the exterior leading side of the finger.

* * * * *